United States Patent
Du et al.

(10) Patent No.: US 11,151,987 B2
(45) Date of Patent: Oct. 19, 2021

(54) METHOD AND SYSTEM FOR INTERACTING WITH THIRD-PARTY APPLICATION

(71) Applicant: BAIDU ONLINE NETWORK TECHNOLOGY (BEIJING) CO., LTD., Beijing (CN)

(72) Inventors: Binyuan Du, Beijing (CN); Yan Zhang, Beijing (CN); Peng Yuan, Beijing (CN); Liangyu Chang, Beijing (CN); Longlong Tian, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 106 days.

(21) Appl. No.: 16/369,866

(22) Filed: Mar. 29, 2019

(65) Prior Publication Data

US 2020/0005771 A1    Jan. 2, 2020

(30) Foreign Application Priority Data

Jun. 29, 2018    (CN) .......................... 201810696091.5

(51) Int. Cl.
*G10L 15/18*    (2013.01)
*G06F 3/16*    (2006.01)
(Continued)

(52) U.S. Cl.
CPC .......... *G10L 15/1815* (2013.01); *G06F 3/167* (2013.01); *G10L 15/30* (2013.01); *G10L 15/34* (2013.01)

(58) Field of Classification Search
CPC ..... G10L 15/1815; G10L 15/30; G10L 15/34; G10L 25/78; G10L 15/22; G06F 3/167; H04L 67/20; G06Q 30/00; H04N 21/472
See application file for complete search history.

(56) References Cited

U.S. PATENT DOCUMENTS

| | | | |
|---|---|---|---|
| 10,127,908 B1* | 11/2018 | Deller | G10L 15/26 |
| 10,224,034 B2* | 3/2019 | Xu | G10L 25/51 |
| 2018/0204569 A1* | 7/2018 | Nadkar | G10L 15/22 |

FOREIGN PATENT DOCUMENTS

| | | |
|---|---|---|
| CN | 102395013 A | 3/2012 |
| CN | 103428166 A | 12/2013 |

(Continued)

OTHER PUBLICATIONS

NPL-CN_104965712_A_I-translation (Year: 2015).*

(Continued)

*Primary Examiner* — Feng-Tzer Tzeng
(74) *Attorney, Agent, or Firm* — Lathrop GPM LLP

(57) ABSTRACT

The present disclosure provides a method and a system for interacting with a third-party application. The method includes receiving voice data from a user for launching the third-party application; sending the voice data to a cloud server; receiving the instruction for launching the third-party application from the cloud server; executing the instruction to launch the third-party application; receiving voice data for operating the third-party application from the user after the third-party application is launched; sending the voice data to the cloud server, such that the cloud server performs voice recognition and semantic understanding on the voice data to obtain an instruction for operating the third-party application; receiving the instruction for operating the third-party application sent by the cloud server and forwarding the instruction to the third-party application, such that the third-party application executes the instruction.

10 Claims, 3 Drawing Sheets

(51) Int. Cl.
*G10L 15/30* (2013.01)
*G10L 15/34* (2013.01)

(56) References Cited

FOREIGN PATENT DOCUMENTS

| CN | 104050966 | A |   | 9/2014  |         |
|----|-----------|---|---|---------|---------|
| CN | 104965712 |   | * | 10/2015 |         |
| CN | 104965712 | A | * | 10/2015 |         |
| CN | 107608799 | A |   | 1/2018  |         |
| CN | 107680591 | A |   | 2/2018  |         |
| CN | 104965712 | B | * | 4/2018  | G06F 8/41 |
| CN | 108064007 | A | * | 5/2018  | H04R 3/02 |
| JP | 2017527844| A |   | 9/2017  |         |

OTHER PUBLICATIONS

Japanese Patent Application No. 2019044357 English translation of first Office Action dated Jun. 23, 2020, 3 pages.
Chinese Patent Application No. CN201810696091.5 English translation of Office Action dated Jun. 12, 2019, 14 pages.
Japanese Patent Application No. 2019-044357, Office Action dated Feb. 2, 2021, 2 pages.
Japanese Patent Application No. 2019-044357, English Translation of Office Action dated Feb. 2, 2021, 2 pages.

* cited by examiner

METHOD AND SYSTEM FOR INTERACTING WITH THIRD-PARTY APPLICATION

CROSS-REFERENCE TO RELATED APPLICATIONS

This application benefits from and claims priority to Chinese Application No. 201810696091.5, filed on Jun. 29, 2018. The entire disclosure of the above application is incorporated herein by reference.

TECHNICAL FIELD

The present disclosure relates to a field of computer application technology, and more particular, to a method and a system for interacting with a third-party application.

BACKGROUND

With the development of the times, clarity of a picture displayed on a television is already greatly improved. Excellent picture resolution gives a considerable advantage in playing video pictures to the television. The television is no longer used for playing a simple television show, which is already developed as a platform for video, entertainment, games, and television programming. Presently, the smart television is integrated with an intelligent interactive voice system. Therefore, a user may naturally interact with the smart television in human language. Changes of the voice interaction also bring unlimited imagination on the television application, giving a great imagination space to the television. Taking advantage of a big screen, the television becomes a platform for voice game platform, voice entertainment and the like, which gives an intelligent voice interaction capability to the television application.

SUMMARY

Various aspects of the present disclosure provide a method and a system for interacting with a third-party application, which may realize to control the third-party application in voice.

In a first aspect of the present disclosure, there is provided a method for interacting with a third-party application. The method includes: receiving, by an interactive system, voice data from a user; sending, by the interactive system, the voice data to a cloud server, such that the cloud server performs voice recognition and semantic understanding on the voice data to obtain an instruction; receiving, by the interactive system, the instruction from the cloud server; and forwarding, by the interactive system, the instruction to the third-party application or executing, by the interactive system, the instruction.

As described above and as a possible implementation, there is further provided an implementation for sending the voice data to the cloud server, including: determining, by the interactive system, whether the interactive system is bound with the third-party application; when the interactive system is bound with the third-party application, binding, by the interactive system, the voice data with an identifier of the third-party application and sending, by the interactive system, the voice data bound with the identifier of the third-party application to the cloud server; and when the interactive system is not bound with the third-party application, sending, by the interactive system, the voice data to the cloud server.

As described above and as a possible implementation, there is further provided an implementation for performing, by the cloud server, the voice recognition and the semantic understanding on the data voice to obtain the instruction, including: when the voice data is bound with the identifier of the third-party application, searching, by the cloud server, for the instruction corresponding to the voice data, from a library of instructions corresponding to the third-party application, and binding, by the cloud server, the instruction with the identifier of the third-party application; or when the voice data is not bound with the identifier of the third-party application, searching, by the cloud server, for the instruction corresponding to the voice data, from a library of instructions corresponding to the interactive system.

As described above and as a possible implementation, there is further provided an implementation for receiving by the interactive system, the instruction from the cloud server, including: receiving, by the interactive system, the instruction bound with the identifier of the third-party application, from the cloud server; or receiving, by the interactive system, the instruction that is not bound with the identifier of the third-party application, from the cloud server.

As described above or as a possible implementation, there is further provided an implementation for forwarding, by the interactive system, the instruction to the third-party application or executing, by the interactive system, the instruction, including: sending, by the interactive system, the instruction bound with the identifier of the third-party application to the third-party application, based on the identifier of the third-party application, such that the third-party application executes the instruction; or executing, by the interactive system, the instruction that is not bound with the identifier of the third-party application.

As described above and as a possible implementation, there is further provided an implementation that the identifier of the third-party application is registered on the interactive system, after the third-party application of the interactive system is launched.

As described above and as a possible implementation, there is further provided an implementation that the library of instructions corresponding to the third-party application is uploaded by a developer of the third-party application to the cloud server.

In another aspect of the present disclosure, there is provided a method for interacting with a third-party application. The method including: receiving, by a cloud server, voice data from a user sent by an interactive system; performing, by the cloud server, voice recognition and semantic understanding on the voice data, to obtain an instruction; and sending, by the cloud server, the instruction to the interactive system, such that the interactive system forwards the instruction to the third-party application or executes the instruction.

As described above and as a possible implementation, there is further provided an implementation that when the interactive system is bound with the third-party application, it is determined that the voice data is bound with the identifier of the third-party application; and when the interactive system is not bound with the third-party application, it is determined that the voice data is not bound with the identifier of the third-party application.

As described above and as a possible implementation, there is further provided an implementation that when the voice data is bound with the identifier of the third-party application, searching for an instruction corresponding to the voice data from a library of instructions corresponding to the third-party application, and binding the instruction with the identifier of the third-party application; or when the voice data is not bound with the identifier of the third-party application, searching for the instruction corresponding to the voice data from a library of instructions corresponding to the interactive system.

As described above or as a possible implementation, there is further provided an implementation for sending, by the cloud server, the instruction to the interactive system, such that the interactive system forwards the instruction to the third-party application or executes the instruction, including sending the instruction bound with the identifier of the third-party application to the interactive system, such that the interactive system sends the instruction bound with the identifier of the third-party application to the third-party application, based on the identifier of the third-party application, and the third-party application executes the instruction; or sending the instruction that is not bound with the identifier of the third-party application to the interactive system, such that the interactive system executes the instruction that is not bound with the identifier of the third-party application.

As described above and as a possible implementation, there is further provided an implementation that the library of instructions corresponding to the third-party application is uploaded by a developer of the third-party application.

In still another aspect of the present disclosure, there is provided a system for interacting with a third-party application. The system includes a voice data sending module, configured to receive voice data from a user and to send the voice data to a cloud server, such that the cloud server performs voice recognition and semantic understanding on the voice data to obtain an instruction; and an instruction receiving module, configured to receive the instruction from the cloud server and to forward the instruction to a third-party application or execute the instruction.

As described above and as a possible implementation, there is further provided an implementation that the voice data sending module is further configured to: determine whether the interactive system is bound with the third-party application; when the interactive system is bound with the third-party application, bind the voice data with an identifier of the third-party application and send the voice data bound with the identifier of the third-party application to the cloud server; and when the interactive system is not bound with the third-party application, send the voice data to the cloud server.

As described above and as a possible implementation, there is further provided an implementation that the cloud server performs the voice recognition and the semantic understanding on the data voice to obtain the instruction by when the voice data is bound with the identifier of the third-party application, searching, by the cloud server, for the instruction corresponding to the voice data, from a library of instructions corresponding to the third-party application, and binding, by the cloud server, the instruction with the identifier of the third-party application; or when the voice data is not bound with the identifier of the third-party application, searching, by the cloud server, for the instruction corresponding to the voice data, from a library of instructions corresponding to the interactive system.

As described above and as a possible implementation, there is further provided an implementation that the instruction receiving module is further configured to: receive the instruction bound with the identifier of the third-party application from the cloud server; or receive the instruction that is not bound with the identifier of the third-party application from the cloud server.

As described above and as a possible implementation, there is further provided an implementation that the instruction receiving module is further configured to: send the instruction bound with the identifier of the third-party application to the third-party application, based on the identifier of the third-party application, such that the third-party application executes the instruction; or execute the instruction that is not bound with the identifier of the third-party application.

As described above and as a possible implementation, there is further provided an implementation that the identifier of the third-party application is registered on the interactive system, after the third-party application of the interactive system is launched.

As described above and as a possible implementation, there is further provided an implementation that the library of instructions corresponding to the third-party application is uploaded by a developer of the third-party application to the cloud server.

In yet another aspect of the present disclosure, there is provided a system for interacting with a third-party application. The system includes: a voice data receiving and processing module, configured to receive voice data from a user sent by an interactive system, and to perform voice recognition and semantic understanding on the voice data, to obtain an instruction; and an instruction sending module, configured to send the instruction to the interactive system, such that the interactive system forwards the instruction to the third-party application or executes the instruction.

As described above and as a possible implementation, there is further provided an implementation that when the interactive system is bound with the third-party application, it is determined that the voice data is bound with the identifier of the third-party application; and when the interactive system is not bound with the third-party application, it is determined that the voice data is not bound with the identifier of the third-party application.

As described above and as a possible implementation, there is further provided an implementation that the voice data receiving and processing module is further configured to: when the voice data is bound with the identifier of the third-party application, search for an instruction corresponding to the voice data from a library of instructions corresponding to the third-party application, and bind the instruction with the identifier of the third-party application; or when the voice data is not bound with the identifier of the third-party application, search for the instruction corresponding to the voice data from a library of instructions corresponding to the interactive system.

As described above and as a possible implementation, there is further provided an implementation that the instruction sending module is further configured to: send the instruction bound with the identifier of the third-party application to the interactive system, such that the interactive system sends the instruction bound with the identifier of the third-party application to the third-party application, based on the identifier of the third-party application, and the third-party application executes the instruction; or send the instruction that is not bound with the identifier of the third-party application to the interactive system, such that the interactive system executes the instruction that is not bound with the identifier of the third-party application.

In yet another aspect of the present disclosure, there is provided a computer device. The computer device includes a memory, a processor and computer programs stored in the memory and executable by the processor. When the computer programs are executed by the processor, a method described above is executed.

In yet another aspect of the present disclosure, there is provided a computer readable storage medium. The computer readable storage medium has computer programs stored thereon. When the computer programs are executed by a processor, the method described above is executed.

From the above description, with embodiments of the present disclosure, interaction with the third-party application is done without a remote controller, thereby realizing hands free. The entire interaction may be done intelligently in voice, thereby improving the user's operation convenience and improving user experience.

DETAILED DESCRIPTION

In order to make purpose, technical solution and benefit of embodiments of the present disclosure more clear, with reference to drawings of the present disclosure, clear and complete descriptions are made to the technical solution of embodiments of the present disclosure. It is obvious that embodiments described herein are merely a part of the present disclosure, but not all of embodiments of the present disclosure. Based on the embodiments of the present disclosure, all other embodiments obtained by those skilled in the art without any inventive words, all belong to a protective scope of the present disclosure.

In related arts, a television-end application still lacks an ability of interaction in voice. When a third-party application is woken by voice, subsequent interactions can only be done through a remote controller, and it is unable to interact with the third-party application in voice, which limits the user experience to the smart television.

Therefore, embodiments of the present disclosure provide a method and a system for interacting with a third-party application.

Figure 1:
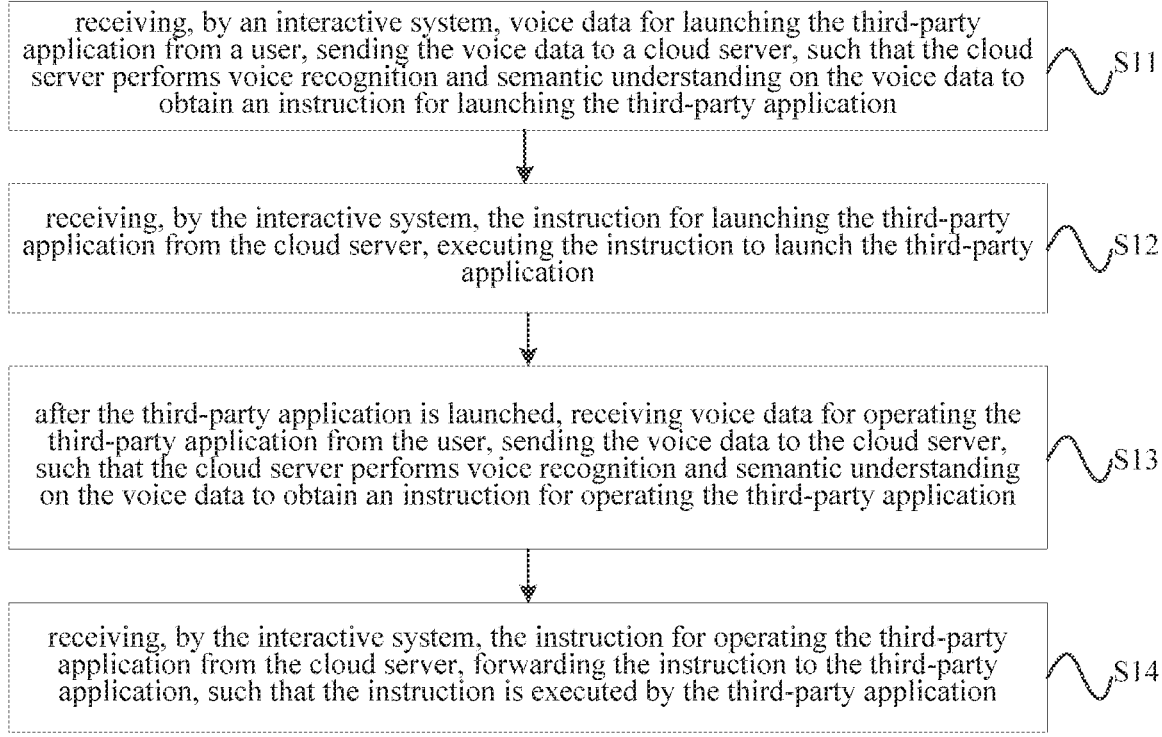
FIG. 1 is a flowchart illustrating a method for interacting with a third-party application according to embodiments of the present disclosure.

FIG. 1 is a flowchart illustrating a method for interacting with a third-party application according to embodiments of the present disclosure, which is applied to an interactive system installed on a smart television. As illustrated in FIG. 1, the method includes the following.

In block S11, voice data for launching a third-party application is received from a user by an interactive system. The voice data is sent to a cloud server, such that the cloud server performs voice recognition and semantic understanding on the voice data, to obtain a corresponding instruction for launching the third-party application.

In block S12, the interactive system receives the instruction for launching the third-party application from the cloud server, executes the instruction and launches the third-party application.

In block S13, voice data for operating the third-party application is received from the user by the interactive system after the third-party application is launched. The voice data is sent to the cloud server, such that the cloud server performs the voice recognition and semantic understanding on the voice data, to obtain the instruction for operating the third-party application.

In block S14, the instruction for operating the third-party application is received from the cloud server by the interactive system and the instruction is forwarded to the third-party application, such that the instruction is executed by the third-party application.

An executive body of embodiments of the present disclosure may be a DuerOS voice intelligence interactive system installed on a smart television. The smart television may include a voice collection unit, a signal processing unit, a communication unit, a voice output unit and the like. The communication unit of the smart television may be connected to the cloud server via a wired or wireless connection manner.

DuerOS Bots Platform is an open platform for providing, by the DuerOS voice intelligence interactive system, a full set of developing, testing, deploying tools to the third-party developer. The third-party developers may simply and efficiently develop a variety of personalized skills on the platform, through a visual interface. For example, the third-party developer needs to develop a self-defined Bot on the DuerOS Bots Platform (i.e., cloud server) and upload it online, so as to control the third-party application in voice.

Taking NetEase Cloud Music as an example, the developer may develop skills such as "play", "next", and "pause" and may upload them onto the DuerOS Bots Platform. When the user provides a voice instruction to the smart television, the DuerOS voice intelligence interactive system may send the voice instruction to the DuerOS Bots Platform. After receiving the voice data from the user, the DuerOS Bots Platform may perform voice recognition and semantic analysis on the voice data, to obtain a user's intention. When the user's intention is matched to expressions of a developer-defined skill, an instruction corresponding to the skill may be sent to the DuerOS voice intelligence interactive system, such that the NetEase Cloud Music installed on the DuerOS voice intelligence interactive system may execute the instruction, to achieve the user's intention.

For example, when the user interacts with the third-party application installed on the DuerOS voice intelligence interactive system of the smart television in voice, it may be required to wake the DuerOS voice intelligence interactive system of the smart television up to launch the third-part application.

The user may provide the voice instruction to the smart television to wake the DuerOS voice intelligence interactive system of the smart television up and to instruct the DuerOS voice intelligence interactive system to launch the third-party application pre-installed thereon. For example, the voice instruction may be "Xiaodu, Xiaodu, Please launch the NetEase Cloud Music".

In an implementation of the block S11, following may be included.

After the DuerOS voice intelligence interactive system is woken up successfully, the voice data for launching the third-party application from the user may be received. The voice data may be sent to the cloud server, such that the cloud server may perform voice recognition and semantic understanding on the voice data to obtain an instruction for launching the third-party application.

For example, the voice collection unit of the smart television, such as a microphone, may collect and cache voice data from an ambient environment where the smart television is located. After the DuerOS voice intelligence interactive system is woken up successfully, the DuerOS voice intelligence interactive system may send the voice data cached after the DuerOS voice intelligence interactive system is woken up to the cloud server for the voice recognition.

For example, after the DuerOS voice intelligence interactive system of the smart television is woken up, it is defaulted that no third-party application is launched. It is determined by the DuerOS voice intelligence interactive system whether the interactive system is bound with a third-party application. When it is determined that no third-party application is bound, the voice data cached after the DuerOS voice intelligence interactive system is woken up may be sent to the cloud end for the voice recognition and the semantic understanding. In detail, voice activity detection may be performed on the voice data cached within 5 seconds after the interactive system is woken up. Voice segments obtained after the voice activity detection may be sent to the cloud server, as the voice data of the user.

The cloud server may apply acoustic echo cancellation (AEC) algorithm to the voice data from the user for cancelling acoustic echoes, and may apply noise suppression (NS) algorithm to the voice data from the user for cancelling environmental voice. Audio features may be extracted from the voice data processed. The audio features obtained may be decoded to obtain a result of voice recognition and text of voice recognition. Natural language processing, i.e., semantic analysis, may be performed on the text of voice recognition. The analyzed content may be categorized and intention matching may be performed thereon, to obtain corresponding machine instruction information. The machine instruction information may be returned back to smart television, as structured data.

For example, since the voice data may be not bound with an identifier of the third-party application, the cloud server may search for an instruction corresponding to the voice data from a library of instructions corresponding to the DuerOS voice intelligence interactive system. The library of instructions corresponding to the DuerOS voice intelligence interactive system may be configured to store control and command statements that are possibly performed on the DuerOS voice intelligence interactive system by the user.

For example, the voice instruction input by the user may be "Xiaodu, Xiaodu, please launch the NetEase Cloud Music". The cloud server may recognize the voice data to obtain the instruction information of "launch the NetEase Cloud Music" and may return the instruction information back to the DuerOS voice intelligence interactive system.

For example, it is required to wake the DuerOS voice intelligence interactive system up by the user, such that the DuerOS voice intelligence interactive system may be operated, or may invoke a self-defined skill of the third-party application.

Receiving by the smart television the audio data, performing wake-up detection with a signal processing module, receiving a wake-up instruction from the user, and waking the DuerOS voice intelligence interactive system may include the following.

A. The voice collection unit of the smart television, such as the microphone, may be configured to collect the audio data in the ambient environment of the smart television, for the wake-up detection.

In some embodiments, the microphone may be always in a pick-up mode (continuously collecting and quantizing audio data), such that the audio data in the ambient environment where the smart television is located may be collected for the wake-up detection.

In some examples, according to actual requirements, the voice collection unit may collect the audio data in the ambient environment where the smart television is located periodically at a predetermined interval, in order to for example reduce power consumption of the smart television. For example, the audio data may be collected periodically at the interval of 10 ms. The interval of periodically collecting the audio data may be preset when the smart TV is shipped from the factory, or may be set by the user according to actual requirements.

In some embodiments, the audio data may be understood as information corresponding to any voice that may be collected by the microphone within the ambient environment of the smart television. For example, the audio data includes voice made by the user, environmental noise or the like, as long as they could be collected by the microphone.

During the collection of the audio data, effect of voice may be varied with performance of the voice collection unit, distance between a voice source and the voice collection unit, and whether the voice collection unit is a single microphone or a microphone array. Generally speaking, the performance of the voice collection unit is high, the distance between the voice source and the voice collection unit is short, and the microphone array instead of the single microphone is used, complete and identifiable audio data may be obtained. For example, in order to enable a far-field (>5 meter) waking up or voice recognition, performance using the microphone array may be better than that using the single microphone. Since generally the distance between the smart television and the user is relatively far, which is far-field, in this embodiment, the microphone array may be used to collect the audio data.

B. Voice activity detection is performed on the audio data collected.

The voice detection module of the signal processing unit may perform the voice activity detection (VAD) on the audio data collected by the microphone. A starting point of a voice segment of the audio signal may be accurately detected. Therefore, a voice segment and a non-voice segment (no voice or noise) signal may be separated from each other.

Since the VAD needs to be done locally by the smart television and computing resources are limited, a threshold-based VAD may be generally used. In addition, an engineering-optimized classification method may also be used.

By performing the voice activity detection on the audio data collected, the voice segment contained in the audio data may be detected. The wake-up detection may be only performed on the voice segment, thereby reducing the power consumption.

C. Wake-up detection is performed on the voice segment detected.

Feature extraction may be performed on the voice segment detected. It is possible that the voice segment could not be used for the voice recognition, since the voice segment detected has some defects. For example, the audio data collected by the microphone may include acoustic echoes, such that it is required to apply the acoustic echo cancellation algorithm to the audio data for cancelling the echoes.

The audio data collected under a certain environment may carry a certain type of noise. Therefore, noise suppression (NS) algorithm may be required to be performed on the audio data for cancelling environmental noises.

The audio features collected may be inputted to a certain decoder to be decoded to obtain the result of voice recognition. During the decoding by the decoder, acoustic model, language model, and pronunciation dictionary may be used. The acoustic model is mainly configured to convert the audio features into syllables. The language model is mainly configured to convert the syllables into text. The pronunciation dictionary is configured to provide a mapping table from syllable to text.

Since it is goal-oriented (it only needs to detect a specified wake-up word), the wake-up detection only needs a smaller acoustic model, a smaller language model and a smaller pronunciation dictionary (it only needs to determine whether there is the wake-up word).

When it is determined that the audio data collected includes the wake-up word, the DuerOS voice intelligence interactive system may be woken up, such that the DuerOS voice intelligence interactive system may perform subsequent operations.

In an implementation of the block S12, following may be included.

An instruction for launching the third-party application sent by the cloud server may be received by the interactive system, the instruction may be executed and the third-party application may be launched.

The DuerOS voice intelligence interactive system may launch the corresponding third-party application according to the received instruction.

In an example, the DuerOS voice intelligence interactive system may accept to bind with the third-party application, to authenticate the third-party application and to register namespace by the third-party application, after the third-party application is launched according to the received instruction.

After the third-party application is bound to the DuerOS voice intelligence interactive system, the third-party application may run in foreground. When the third-party application is closed, it may be required to de-bind the third-party application from the DuerOS voice intelligence interactive system.

The third-party application may register the namespace, as the identifier of the third-party application.

In an example, after the DuerOS voice intelligence interactive system is woken up successfully, the voice data may be sent to the cloud server, such that the cloud server may perform the voice recognition and semantic understanding on the voice data to obtain the instruction, where the voice data received may be the voice data from the user for operating the DuerOS voice intelligence interactive system. The instruction may be executed by the DuerOS voice intelligence interactive system.

In an implementation of the block S13, following may be included.

After the DuerOS voice intelligence interactive system launches the third-party application, the voice data for operating the third-party application from the user may be received. The voice data may be sent to the cloud server, such that the cloud server may perform the voice recognition and the semantic understanding on the voice data to obtain the instruction for operating the third-party application.

In an example, the voice collection unit of the smart television, such as the microphone, may collect and cache the audio data in the ambient environment where the smart television is located. Therefore, after the DuerOS voice intelligence interactive system is woken up successfully, the DuerOS voice intelligence interactive system may send the audio data cached after the DuerOS voice intelligence interactive system is woken up to the cloud server, for the voice recognition.

In an example, it is determined by the DuerOS voice intelligence interactive system whether a third-party application is bound thereto. When there is the third-party application bound to the DuerOS voice intelligence interactive system, the DuerOS voice intelligence interactive system may bind the audio data cached after the DuerOS voice intelligence interactive system is woken up with the identifier of the third-party application, and send the audio data bound with the identifier of the third-party application to the cloud end for the voice recognition and the semantic understanding. In detail, the voice activity detection may be performed on the audio data cached within 5 seconds after the DuerOS voice intelligence interactive system is woken up. Voice segments obtained after the voice activity detection may be sent to the cloud server, as the voice data of the user.

In an example, the identifier of the third-party application may be a namespace registered on the DuerOS voice intelligence interactive system by the third-party application.

The cloud server may perform the acoustic echo cancellation (AEC) algorithm on the voice data of the user for cancelling echoes, and may perform the noise suppression (NS) algorithm on the voice data for cancelling environmental noise. Audio features may be extracted from the voice data of the user processed. The audio features extracted may be decoded to obtain a result of voice recognition and text of voice recognition. Natural language processing (i.e., the semantic analysis) may be performed on the text of voice recognition. The analyzed content may be categorized and may be performed with intention matching, to obtain corresponding machine instruction information. The machine instruction information may be returned back to the smart television, as structural data.

In an example, since the voice data may be bound with the identifier of the third-party application, the cloud server may search a library of instructions corresponding to the third-party application based on the identifier of the third-party application to obtain the instruction corresponding to the voice data from the library of instructions. The library of instructions corresponding to the third-party application may be uploaded by the developer of the third-party application to the cloud server and may be configured to store control and command statements that may be possibly performed on the third-party application by the user.

For example, the voice instruction inputted by the use may be "Xiaodu, Xiaodu, Next one". The cloud server may recognize the voice instruction to obtain the instruction information of "next one" and may return the instruction information back to the DuerOS voice intelligence interactive system.

Since the voice data may be bound with the identifier of the third-party application, the cloud server may bind the instruction with the identifier of the third-party application and return the instruction bound with the identifier of the third-party application back to the DuerOs voice intelligence interactive system. Therefore, the DuerOs voice intelligence interactive system may forward the instruction to the third-party application according to the identifier of the third-party application.

In an example, it may be required to wake the DuerOS voice intelligence interactive system up by the user, such that the DuerOS voice intelligence interactive system may be operated, or may invoke a self-defined skill of the third-party application.

In an implementation of the block S14, following may be included.

The DuerOS voice intelligence interactive system may receive the instruction for operating the third-party application from the cloud sever, and may forward the instruction to the third-party application, such that the third-party application may execute the instruction.

In an example, the DuerOS voice intelligence interactive system may forward the instruction to the third-party application based on the identifier of the third-party application bounded with the instruction, such that the third-party application may execute the instruction.

In an example, before the DuerOS voice intelligence interactive system forwards the instruction to the third-party application, it may be determined whether the third-party application is still bound to the DuerOS voice intelligence interactive system. For example, it may be determined whether the NetEase Cloud Music is already closed. When the third-party application is still bound with the DuerOS voice intelligence interactive system, the instruction may be directly forwarded to the third-party application, such that the instruction may be executed by the third-party application. A result of executing the instruction by the third-party application may be received by the DuerOS voice intelligence interactive system. When the third-party application is not bound with the DuerOS voice intelligence interactive system, the user may be informed that the third-party application is already closed, please re-launch the third-party application.

From the above description, with embodiments of the present disclosure, interaction with the third-party application is done without a remote controller, thereby realizing hands free. The entire interaction may be done intelligently in voice, thereby improving the user's operation convenience and improving user experience.

Figure 2:
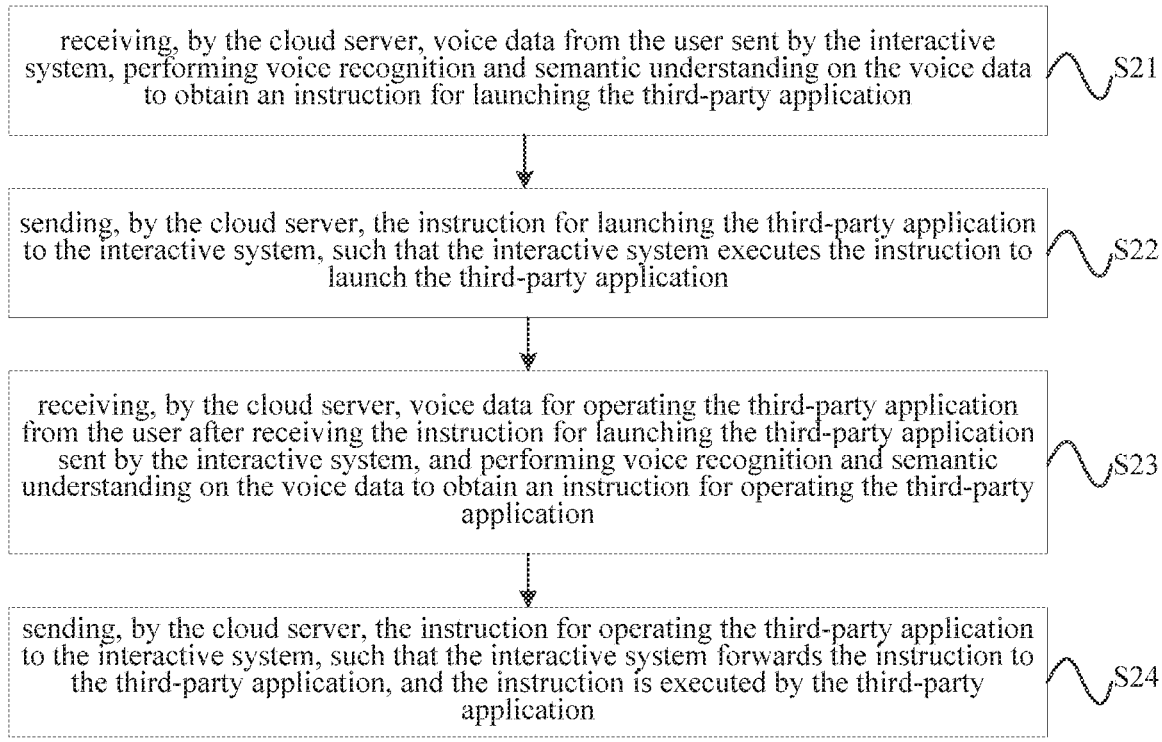
FIG. 2 is a flowchart illustrating a method for interacting with a third-party application according to embodiments of the present disclosure.

FIG. 2 is a flowchart illustrating a method for interacting with a third-party application according to embodiments of the present disclosure. The method may be applied to a cloud server. As illustrated in FIG. 2, the method may include the following.

In block S21, the cloud server receives voice data from a user sent by an interactive system, and performs voice recognition and semantic understanding on the voice data to obtain an instruction for launching the third-party application.

In block S22, the cloud server returns the instruction for launching the third-party application back to the interactive system, such that the interactive system executes the instruction to launch the third-party application.

In block S23, the cloud server receives voice data for operating the third-party application from the user after receiving the instruction for launching the third-party application sent by the interactive system, and performs the voice recognition and semantic understanding on the voice data to obtain the instruction for operating the third-party application.

At block S24, the cloud server returns the instruction for operating the third-party application back to the interactive system, such that the interactive system forwards the instruction to the third-party application and the third-party application executes the instruction.

An executive body of embodiments may be the cloud server. The interactive system may be a DuerOS voice intelligence interactive system installed on a smart TV. The smart TV may include a voice collection unit, a signal processing unit, a communication unit, and a voice outputting unit. The communication unit of the smart TV may be connected with the cloud server in a wired or wireless connection manner.

DuerOS Bots Platform is an open platform for providing, by the DuerOS voice intelligence interactive system, a full set of developing, testing, deploying tools to a third-party developer. The third-party developer may simply and efficiently develop a variety of personalized skills on the platform, through a visual interface. In an example, the third-party developer needs to develop a self-defined Bot on the DuerOS Bots Platform (i.e., cloud server) and upload it online, so as to control the third-party application in voice.

Taking NetEase Cloud Music as an example, the developer may develop skills such as "play", "next" and "pause" and may upload them onto the DuerOS Bots Platform. When the user provides a voice instruction to a smart television, the DuerOS voice intelligence interactive system may send the voice instruction to the DuerOS Bots Platform. After receiving the voice data provided by the user, the DuerOS Bots Platform may perform voice recognition and semantic analysis on the voice data, to obtain a user's intention. When the user's intention is matched to expression of a developer-defined skill, the instruction corresponding to the skill may be sent to the DueosOS voice intelligence interactive system, such that the NetEase Cloud music installed on the DuerOS voice intelligence interactive system may execute the instruction, to achieve user's intention.

In an example, when the user interacts with the third-party application installed on the DuerOS voice intelligence interactive system of the smart television in voice, the DuerOS voice intelligence interactive system of the smart television may be woken up to launch the third-part application.

The user may provide the voice instruction to the smart television to wake the DuerOS voice intelligence interactive system of the smart television up and to instruct the DuerOS voice intelligence interactive system to launch the third-party application pre-installed thereon. For example, the voice instruction may be "Xiaodu, Xiaodu, Please launch the NetEase Cloud Music".

In an implementation of the block S21, following may be included.

When it is determined by the smart television that the audio data collected contains a wake-up word, the DuerOS voice intelligence interactive system is woken up, such that the DuerOS voice intelligence interactive system may perform subsequent operations.

After the DuerOS voice intelligence interactive system is woken up successfully, the voice data for launching the third-party application from the user may be received. The voice data may be sent to the cloud server, such that the cloud server may perform voice recognition and semantic understanding on the voice data to obtain a corresponding instruction for launching the third-party application.

In an example, the voice collection unit of the smart TV, such as the microphone, may collect and cache the voice data in an ambient environment where the smart TV is located. After the DuerOS voice intelligence interactive system is woken up successfully, the DuerOS voice intelligence interactive system may send the voice data cached after the DuerOS voice intelligence interactive system is woken up to the cloud server for the voice recognition.

In an example, after the DuerOS voice intelligence interactive system of the smart TV is woken up, it is defaulted that no third-party application is launched. It is determined whether the interactive system is bound with a third-party application. When it is determined that no third-party application is bound, the voice data cached after the DuerOS voice intelligence interactive system is woken up may be sent to the cloud end for the voice recognition and the semantic understanding. In detail, voice activity detection may be performed on the voice data cached within 5 seconds after the interactive system is woken up. Voice segments obtained after the voice activity detection may be sent to the cloud server, as the voice data of the user.

The cloud server may receive the voice data from the user sent by the interactive system, and may perform the voice recognition and the sematic understanding on the voice data to obtain the instruction for launching the third-party application.

The cloud server may apply acoustic echo cancellation (AEC) algorithm to the voice data from the user for cancelling acoustic echoes, and may apply noise suppression (NS) algorithm to the voice data from the user for cancelling environmental voice. Audio features may be extracted from the voice data processed. The audio features obtained may be decoded to obtain a result of voice recognition and text of voice recognition. Natural language processing (i.e., semantic analysis) may be performed on the text of voice recognition. The analyzed content may be categorized and may be performed with intention matching, to obtain corresponding machine instruction information. The machine instruction information may be returned back to smart television as structured data.

In an example, since the voice data may be not bound with an identifier of the third-party application, the cloud server may search for an instruction corresponding to the voice data from a library of instructions corresponding to the DuerOS voice intelligence interactive system. The library of instructions corresponding to the DuerOS voice intelligence interactive system may be configured to store control and command statements that are possibly performed on the DuerOS voice intelligence interactive system by the user.

For example, the voice instruction inputted by the user may be "Xiaodu, Xiaodu, please launch the NetEase Cloud Music". The cloud server may recognize the voice data to obtain the instruction of "launch the NetEase Cloud Music".

In an implementation of the block S22, following may be included.

The cloud server may send the instruction for launching the third-party application to the interactive system, such that the interactive system may execute the instruction to launch the third-party application.

The DuerOS voice intelligence interactive system may launch the third-party application according to the received instruction.

In an example, the DuerOS voice intelligence interactive system may accept to bind with the third-party application, to authenticate the third-party application and to register namespace by the third-party application, after the third-party application is launched according to the received instruction.

After the third-party application is bound to the DuerOS voice intelligence interactive system, the third-party application may run in foreground. When the third-party application is closed, it may be required to de-bind the third-party application from the DuerOS voice intelligence interactive system.

The third-party application may register the namespace, as the identifier of the third-party application.

In an example, after the DuerOS voice intelligence interactive system is woken up successfully, the voice data may be sent to the cloud server, such that the cloud server may perform the voice recognition and semantic understanding on the voice data to obtain the instruction, where the voice data received may be the voice data from the user for operating the DuerOS voice intelligence interactive system. The instruction may be executed by the DuerOS voice intelligence interactive system.

In an implementation of the block S23, following may be included.

After the cloud server receives the instruction for launching the third-party application sent by the interactive system, the cloud server may receive voice data for operating the third-party application from the user, and may perform the voice recognition and the semantic understanding on the voice data to obtain the instruction for operating the third-party application.

After the DuerOS voice intelligence interactive system launches the third-party application, the voice data from the user for operating the third-party application may be received. The voice data may be sent to the cloud server, such that the cloud server may perform the voice recognition and the semantic understanding on the voice data to obtain the instruction for operating the third-party application.

In an example, the voice collection unit of the smart television, such as the microphone, may collect and cache the audio data in the ambient environment where the smart television is located. Therefore, after the DuerOS voice intelligence interactive system is woken up successfully, the DuerOS voice intelligence interactive system may send the audio data cached after the DuerOS voice intelligence interactive system is woken up to the cloud server, for the voice recognition.

In an example, it is determined by the DuerOS voice intelligence interactive system whether a third-party application is bound thereto. When there is the third-party application bound to the DuerOS voice intelligence interactive system, the DuerOS voice intelligence interactive system may bind the audio data cached after the DuerOS voice intelligence interactive system is woken up with the identifier of the third-party application, and send the audio data bound with the identifier of the third-party application to the cloud end for the voice recognition and the semantic understanding. In detail, the voice activity detection may be performed on the audio data cached within 5 seconds after the DuerOS voice intelligence interactive system is woken up. Voice segments obtained after the voice activity detection may be sent to the cloud server as the voice data of the user.

In an example, the identifier of the third-party application may be the namespace registered on the DuerOS voice intelligence interactive system by the third-party application.

The cloud server may perform the acoustic echo cancellation (AEC) algorithm on the voice data of the user for cancelling echoes, and may perform the noise suppression (NS) algorithm on the voice data of the user for cancelling environmental noise. Audio features may be extracted from the voice data of the user processed. The audio features extracted may be decoded to obtain a result of voice recognition and text of voice recognition. Natural language processing (i.e., the semantic analysis) may be performed on the text of voice recognition. The analyzed content may be categorized and may be performed with intention matching, to obtain corresponding machine instruction information. The machine instruction information may be returned back to the smart television as structural data.

In an example, since the voice data may be bound with the identifier of the third-party application, the cloud server may search for the instruction corresponding to the voice data from a library of instructions corresponding to the third-party application according to the identifier of the third-party application. The library of instructions corresponding to the third-party application may be uploaded by the developer of the third-party application to the cloud server and may be configured to store control and command statements that may be possibly performed on the third-party application by the user.

For example, the voice data inputted by the user may be "Xiaodu, Xiaodu, next one". The cloud server may recognize the instruction information of "Next One" and may return the instruction information back to the DuerOS voice intelligence interactive system.

Since the voice data is bound with the identifier of the third-party application, the cloud server may bind the instruction with the identifier of the third-party application and return the instruction bound with the identifier of the third-party application back to the DuerOs voice intelligence interactive system. Therefore, the DuerOs voice intelligence interactive system may forward the instruction to the third-party application according to the identifier of the third-party application.

In an example, it may be required to wake the DuerOS voice intelligence interactive system up by the user, such that the DuerOS voice intelligence interactive system may be operated, or may invoke a self-defined skill of the third-party application.

In an implementation of the block S24, following may be included.

The cloud server may send the instruction for operating the third-party application to the interactive system, such that the interactive system may forward the instruction to the third-party application, and the instruction may be executed by the third-party application.

The DuerOS voice intelligence interactive system may receive the instruction for operating the third-party application from the cloud sever, and forward the instruction to the third-party application, such that the third-party application may execute the instruction.

In an example, the DuerOS voice intelligence interactive system may forward the instruction to the third-party application based on the identifier of the third-party application bounded with the instruction, such that the third-party application may execute the instruction.

In an example, before the DuerOS voice intelligence interactive system forwards the instruction to the third-party application, it may be determined whether the third-party application is still bound to the DuerOS voice intelligence interactive system. For example, it may be determined whether the NetEase Cloud Music is already closed. When the third-party application is still bound with the DuerOS voice intelligence interactive system, the instruction may be directly forwarded to the third-party application, such that the instruction may be executed by the third-party application. A result of executing the instruction by the third-party application may be received. When the third-party application is not bound with the DuerOS voice intelligence interactive system, the user may be informed that the third-party application is already closed, please re-launch the third-party application.

From the above description, with embodiments of the present disclosure, the cloud server may determine whether the instruction obtained by performing the voice recognition and the semantic understanding corresponds to the interactive system or to the third-party application, based on a fact whether the voice date is bound with the identifier of the third-party application. Interaction with the third-party application is done without a remote controller, thereby realizing hands free. The entire interaction may be done intelligently in voice, thereby improving the user's operation convenience and improving user experience.

Figure 3:
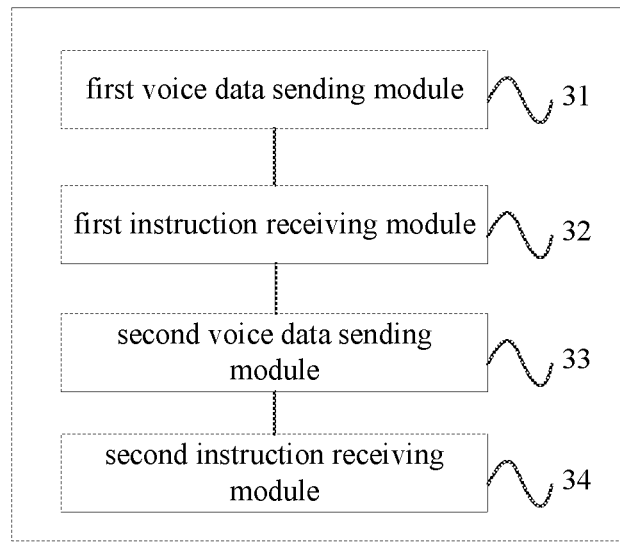
FIG. 3 is a schematic diagram illustrating a system for interacting with a third-party application according to embodiments of the present disclosure.

FIG. 3 is a schematic diagram illustrating a system for interacting with a third-party application according to embodiments of the present disclosure. As illustrated in FIG. 3, the system includes the following.

A first voice data sending module 31 is configured to receive voice data for launching the third-party application from a user and to send the voice data to a cloud server, such that the cloud server performs voice recognition and semantic understanding on the voice data to obtain an instruction for launching the third-party application.

A first instruction receiving module 32, configured to receive the instruction for launching the third-party application from the cloud server and to execute the instruction to launch the third-party application.

A second voice sending module 33 is configured to receive voice data for operating the third-party application from a user and to send the voice data to the cloud server, such that the cloud server performs the voice recognition and the semantic understanding on the voice data to obtain an instruction for operating the third-party application.

A second instruction receiving module 34 is configured to receive the instruction for operating the third-party application from the cloud server and forward the instruction to the third-party application, such that the instruction is executed by the third-party application.

An executive body of embodiments of the present disclosure may be a DuerOS voice intelligence interactive system installed on a smart television. The smart television may include a voice collection unit, a signal processing unit, a communication unit, a voice output unit and the like. The communication unit of the smart television may be connected to the cloud server via a wired or wireless connection manner.

DuerOS Bots Platform is an open platform for providing, by the DuerOS voice intelligence interactive system, a full set of developing, testing, deploying tools to the third-party developer. The third-party developers may simply and efficiently develop a variety of personalized skills on the platform, through a visual interface. For example, the third-party developer needs to develop a self-defined Bot on the DuerOS Bots Platform (i.e., cloud server) and upload it online, so as to control the third-party application in voice.

Taking NetEase Cloud Music as an example, the developer may develop skills such as "play", "next", and "pause" and may upload them onto the DuerOS Bots Platform. When the user provides a voice instruction to the smart television, the DuerOS voice intelligence interactive system may send the voice instruction to the DuerOS Bots Platform. After receiving the voice data from the user, the DuerOS Bots Platform may perform voice recognition and semantic analysis on the voice data, to obtain a user's intention. When the user's intention is matched to expressions of a developer-defined skill, an instruction corresponding to the skill may be sent to the DuerOS voice intelligence interactive system, such that the NetEase Cloud Music installed on the DuerOS voice intelligence interactive system may execute the instruction, to achieve the user's intention.

For example, when the user interacts with the third-party application installed on the DuerOS voice intelligence interactive system of the smart television in voice, it may be required to wake the DuerOS voice intelligence interactive system of the smart TV up to launch the third-part application.

The user may provide the voice instruction to the smart television to wake the DuerOS voice intelligence interactive system of the smart television up and to instruct the DuerOS voice intelligence interactive system to launch the third-party application pre-installed thereon. For example, the voice instruction may be "Xiaodu, Xiaodu, Please launch the NetEase Cloud Music".

In an implementation of the first voice data sending module 31, following may be included.

After the DuerOS voice intelligence interactive system is woken up successfully, the voice data for launching the third-party application from the user by the first voice data sending module 31. The voice data may be sent to the cloud server, such that the cloud server may perform voice recognition and semantic understanding on the voice data to obtain an instruction for launching the third-party application.

For example, the voice collection unit of the smart television, such as a microphone, may collect and cache voice data from an ambient environment where the smart television is located. After the DuerOS voice intelligence interactive system is woken up successfully, the DuerOS voice intelligence interactive system may send the voice data cached after the DuerOS voice intelligence interactive system is woken up to the cloud server for the voice recognition.

For example, after the DuerOS voice intelligence interactive system of the smart television is woken up, it is defaulted that no third-party application is launched. It is determined by the first voice data sending module 31 whether the interactive system is bound with a third-party application. When it is determined that no third-party application is bound, the voice data cached after the DuerOS voice intelligence interactive system is woken up may be sent to the cloud end for the voice recognition and the semantic understanding. In detail, voice activity detection may be performed on the voice data cached within 5 seconds after the interactive system is woken up. Voice segments obtained after the voice activity detection may be sent to the cloud server, as the voice data of the user.

The cloud server may apply acoustic echo cancellation (AEC) algorithm to the voice data from the user for cancelling acoustic echoes, and may apply noise suppression (NS) algorithm to the voice data from the user for cancelling environmental voice. Audio features may be extracted from the voice data processed. The audio features obtained may be decoded to obtain a result of voice recognition and text of voice recognition. Natural language processing, i.e., semantic analysis, may be performed on the text of voice recognition. The analyzed content may be categorized and may be performed with intention matching, to obtain corresponding machine instruction information. The machine instruction information may be returned back to smart television, as structured data.

For example, since the voice data may be not bound with an identifier of the third-party application, the cloud server may search for an instruction corresponding to the voice data from a library of instructions corresponding to the DuerOS voice intelligence interactive system. The library of instructions corresponding to the DuerOS voice intelligence interactive system may be configured to store control and command statements that are possibly performed on the DuerOS voice intelligence interactive system by the user.

For example, the voice instruction input by the user may be "Xiaodu, Xiaodu, please launch the NetEase Cloud Music". The cloud server may recognize the voice data to obtain the instruction information of "launch the NetEase Cloud Music" and may return the instruction information back to the DuerOS voice intelligence interactive system.

For example, it is required to wake the DuerOS voice intelligence interactive system up by the user, such that the DuerOS voice intelligence interactive system may be operated, or may invoke a self-defined skill of the third-party application.

Receiving by the smart television the audio data, performing wake-up detection with a signal processing module, receiving a wake-up instruction from the user, and waking the DuerOS voice intelligence interactive system may include the following.

A. The voice collection unit of the smart television, such as the microphone, may be configured to collect the audio data in the ambient environment of the smart television, for the wake-up detection.

In some embodiments, the microphone may be always in a pick-up mode (continuously collecting and quantizing audio data), such that the audio data in the ambient environment where the smart television is located may be collected for the wake-up detection.

In some examples, according to actual requirements, the voice collection unit may collect the audio data in the ambient environment where the smart television is located periodically at a predetermined interval, in order to for example reduce power consumption of the smart television. For example, the audio data may be collected periodically at the interval of 10 ms. The interval of periodically collecting the audio data may be preset when the smart TV is shipped from the factory, or may be set by the user according to actual requirements.

In some embodiments, the audio data may be understood as information corresponding to any voice that may be collected by the microphone within the ambient environment of the smart television. For example, the audio data includes voice made by the user, environmental noise or the like, as long as they could be collected by the microphone.

During the collection of the audio data, effect of voice may be varied with performance of the voice collection unit, distance between a voice source and the voice collection unit, and whether the voice collection unit is a single microphone or a microphone array. Generally speaking, the performance of the voice collection unit is high, the distance between the voice source and the voice collection unit is short, and the microphone array instead of the single microphone is used, complete and identifiable audio data may be obtained. For example, in order to enable a far-field (>5 meter) waking up or voice recognition, performance using the microphone array may be better than that using the single microphone. Since generally the distance between the smart television and the user is relatively far, which is far-field, in this embodiment, the microphone array may be used to collect the audio data.

B. Voice activity detection is performed on the audio data collected.

The voice detection module of the signal processing unit may perform the voice activity detection (VAD) on the audio data collected by the microphone. A starting point of a voice segment of the audio signal may be accurately detected. Therefore, a voice segment and a non-voice segment (no voice or noise) signal may be separated from each other.

Since the VAD needs to be done locally by the smart television and computing resources are limited, a threshold-based VAD may be generally used. In addition, an engineering-optimized classification method may also be used.

By performing the voice activity detection on the audio data collected, the voice segment contained in the audio data may be detected. The wake-up detection may be only performed on the voice segment, thereby reducing the power consumption.

C. Wake-up detection is performed on the voice segment detected.

Feature extraction may be performed on the voice segment detected. It is possible that the voice segment could not be used for the voice recognition, since the voice segment detected has some defects. For example, the audio data collected by the microphone may include acoustic echoes, such that it is required to apply the acoustic echo cancellation algorithm to the audio data for cancelling the echoes. The audio data collected under a certain environment may carry a certain type of noise. Therefore, noise suppression (NS) algorithm may be required to be performed on the audio data for cancelling environmental noises.

The audio features collected may be inputted to a certain decoder to be decoded to obtain the result of voice recognition. During the decoding by the decoder, acoustic model, language model, and pronunciation dictionary may be used. The acoustic model is mainly configured to convert the audio features into syllables. The language model is mainly configured to convert the syllables into text. The pronunciation dictionary is configured to provide a mapping table from syllable to text.

Since it is goal-oriented (it only needs to detect a specified wake-up word), the wake-up detection only needs a smaller acoustic model, a smaller language model and a smaller pronunciation dictionary (it only needs to determine whether there is the wake-up word).

When it is determined that the audio data collected includes the wake-up word, the DuerOS voice intelligence interactive system may be woken up, such that the DuerOS voice intelligence interactive system may perform subsequent operations.

In an implementation of the first instruction receiving module 32, following may be included.

An instruction for launching the third-party application sent by the cloud server may be received by the first instruction receiving module 32, the instruction may be executed and the third-party application may be launched.

The DuerOS voice intelligence interactive system may launch the corresponding third-party application according to the received instruction.

In an example, the DuerOS voice intelligence interactive system may accept to bind with the third-party application, to authenticate the third-party application and to register namespace by the third-party application, after the third-party application is launched according to the received instruction.

After the third-party application is bound to the DuerOS voice intelligence interactive system, the third-party application may run in foreground. When the third-party application is closed, it may be required to de-bind the third-party application from the DuerOS voice intelligence interactive system.

The third-party application may register the namespace, as the identifier of the third-party application.

In an example, after the DuerOS voice intelligence interactive system is woken up successfully, the voice data may be sent to the cloud server, such that the cloud server may perform the voice recognition and semantic understanding on the voice data to obtain the instruction, where the voice data received may be the voice data from the user for operating the DuerOS voice intelligence interactive system. The instruction may be executed by the DuerOS voice intelligence interactive system.

In an implementation of the second voice data sending module 33, following may be included.

After the DuerOS voice intelligence interactive system launches the third-party application, the voice data for operating the third-party application from the user may be received by the second voice data sending module 33. The voice data may be sent to the cloud server, such that the cloud server may perform the voice recognition and the semantic understanding on the voice data to obtain the instruction for operating the third-party application.

In an example, the voice collection unit of the smart television, such as the microphone, may collect and cache the audio data in the ambient environment where the smart television is located. Therefore, after the DuerOS voice intelligence interactive system is woken up successfully, the DuerOS voice intelligence interactive system may send the audio data cached after the DuerOS voice intelligence interactive system is woken up to the cloud server, for the voice recognition.

In an example, it is determined by the second voice data sending module 33 whether a third-party application is bound. When there is the third-party application bound to the DuerOS voice intelligence interactive system, the DuerOS voice intelligence interactive system may bind the audio data cached after the DuerOS voice intelligence interactive system is woken up with the identifier of the third-party application, and send the audio data bound with the identifier of the third-party application to the cloud end for the voice recognition and the semantic understanding. In detail, the voice activity detection may be performed on the audio data cached within 5 seconds after the DuerOS voice intelligence interactive system is woken up. Voice segments obtained after the voice activity detection may be sent to the cloud server, as the voice data of the user.

In an example, the identifier of the third-party application may be a namespace registered on the DuerOS voice intelligence interactive system by the third-party application.

The cloud server may perform the acoustic echo cancellation (AEC) algorithm on the voice data of the user for cancelling echoes, and may perform the noise suppression (NS) algorithm on the voice data for cancelling environmental noise. Audio features may be extracted from the voice data of the user processed. The audio features extracted may be decoded to obtain a result of voice recognition and text of voice recognition. Natural language processing (i.e., the semantic analysis) may be performed on the text of voice recognition. The analyzed content may be categorized and may be performed with intention matching, to obtain corresponding machine instruction information. The machine instruction information may be returned back to the smart television, as structural data.

In an example, since the voice data may be bound with the identifier of the third-party application, the cloud server may search a library of instructions corresponding to the third-party application based on the identifier of the third-party application to obtain the instruction corresponding to the voice data from the library of instructions. The library of instructions corresponding to the third-party application may be uploaded by the developer of the third-party application to the cloud server and may be configured to store control and command statements that may be possibly performed on the third-party application by the user.

For example, the voice instruction inputted by the use may be "Xiaodu, Xiaodu, next one". The cloud server may recognize the voice instruction to obtain the instruction information of "next one" and may return the instruction information back to the DuerOS voice intelligence interactive system.

Since the voice data may be bound with the identifier of the third-party application, the cloud server may bind the instruction with the identifier of the third-party application and return the instruction bound with the identifier of the third-party application back to the DuerOs voice intelligence interactive system. Therefore, the DuerOs voice intelligence interactive system may forward the instruction to the third-party application according to the identifier of the third-party application.

In an example, it may be required to wake the DuerOS voice intelligence interactive system up by the user, such that the DuerOS voice intelligence interactive system may be operated, or may invoke a self-defined skill of the third-party application.

In an implementation of the second instruction receiving module 34, following may be included.

The second instruction receiving module 34 may receive the instruction for operating the third-party application from the cloud sever, and may forward the instruction to the third-party application, such that the third-party application may execute the instruction.

In an example, the second instruction receiving module 34 may forward the instruction to the third-party application based on the identifier of the third-party application bounded with the instruction, such that the third-party application may execute the instruction.

In an example, before the second instruction receiving module 34 forwards the instruction to the third-party application, it may be determined whether the third-party application is still bound to the DuerOS voice intelligence interactive system. For example, it may be determined whether the NetEase Cloud Music is already closed. When the third-party application is still bound with the DuerOS voice intelligence interactive system, the instruction may be directly forwarded to the third-party application, such that the instruction may be executed by the third-party application. A result of executing the instruction by the third-party application may be received by the DuerOS voice intelligence interactive system. When the third-party application is not bound with the DuerOS voice intelligence interactive system, the user may be informed that the third-party application is already closed, please re-launch the third-party application.

From the above description, with embodiments of the present disclosure, interaction with the third-party application is done without a remote controller, thereby realizing hands free. The entire interaction may be done intelligently in voice, thereby improving the user's operation convenience and improving user experience.

Figure 4:
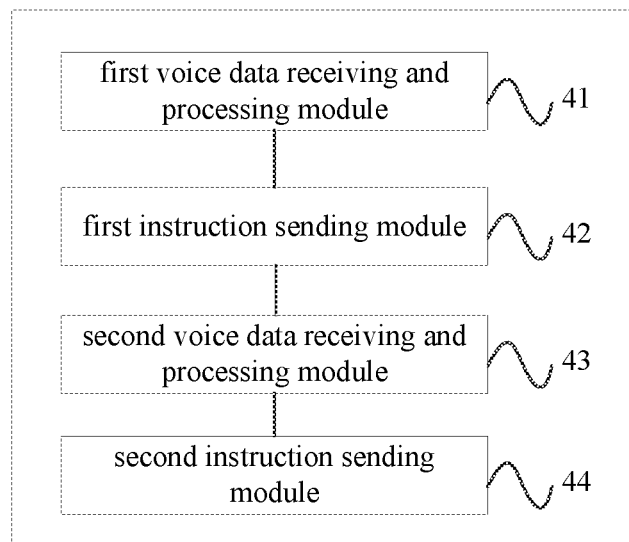
FIG. 4 is a schematic diagram illustrating a system for interacting with a third-party application according to embodiments of the present disclosure.

FIG. 4 is a schematic diagram illustrating a system for interacting with a third-party application according to embodiments of the present disclosure, which may be applied to a cloud server. As illustrated in FIG. 4, the system may include the following.

A first voice data receiving and processing module 41, configured to receive voice data from a user sent by an interactive system, and perform voice recognition and semantic understanding on the voice data to obtain an instruction for launching the third-party application.

A first instruction sending module 42 is configured to return the instruction for launching the third-party application back to the interactive system, such that the interactive system executes the instruction to launch the third-party application.

A second voice data receiving and processing module 43 is configured to receive voice data for operating the third-party application from the user after receiving the instruction for launching the third-party application sent by the interactive system, and perform the voice recognition and semantic understanding on the voice data to obtain the instruction for operating the third-party application.

A second instruction sending module 44 is configured to return the instruction for operating the third-party application back to the interactive system, such that the interactive system forwards the instruction to the third-party application and the third-party application executes the instruction.

An executive body of embodiments may be the cloud server. The interactive system may be a DuerOS voice intelligence interactive system installed on a smart TV. The smart TV may include a voice collection unit, a signal processing unit, a communication unit, and a voice outputting unit. The communication unit of the smart TV may be connected with the cloud server in a wired or wireless connection manner.

DuerOS Bots Platform is an open platform for providing, by the DuerOS voice intelligence interactive system, a full set of developing, testing, deploying tools to a third-party developer. The third-party developer may simply and efficiently develop a variety of personalized skills on the platform, through a visual interface. In an example, the third-party developer needs to develop a self-defined Bot on the DuerOS Bots Platform (i.e., cloud server) and upload it online, so as to control the third-party application in voice.

Taking NetEase Cloud Music as an example, the developer may develop skills such as "play", "next" and "pause" and may upload them onto the DuerOS Bots Platform. When the user provides a voice instruction to a smart television, the DuerOS voice intelligence interactive system may send the voice instruction to the DuerOS Bots Platform. After receiving the voice data provided by the user, the DuerOS Bots Platform may perform voice recognition and semantic analysis on the voice data, to obtain a user's intention. When the user's intention is matched to expression of a developer-defined skill, the instruction corresponding to the skill may be sent to the DueosOS voice intelligence interactive system, such that the NetEase Cloud music installed on the DuerOS voice intelligence interactive system may execute the instruction, to achieve user's intention.

In an example, when the user interacts with the third-party application installed on the DuerOS voice intelligence interactive system of the smart television in voice, the DuerOS voice intelligence interactive system of the smart television may be woken up to launch the third-part application.

The user may provide the voice instruction to the smart television to wake the DuerOS voice intelligence interactive system of the smart television up and to instruct the DuerOS voice intelligence interactive system to launch the third-party application pre-installed thereon. For example, the voice instruction may be "Xiaodu, Xiaodu, Please launch the NetEase Cloud Music".

In an implementation of the first voice data receiving and processing module 41, following may be included.

When it is determined by the smart television that the audio data collected contains a wake-up word, the DuerOS voice intelligence interactive system is woken up, such that the DuerOS voice intelligence interactive system may perform subsequent operations.

After the DuerOS voice intelligence interactive system is woken up successfully, the voice data for launching the third-party application from the user may be received. The voice data may be sent to the cloud server, such that the cloud server may perform voice recognition and semantic understanding on the voice data to obtain a corresponding instruction for launching the third-party application.

In an example, the voice collection unit of the smart TV, such as the microphone, may collect and cache the voice data in an ambient environment where the smart TV is located. After the DuerOS voice intelligence interactive system is woken up successfully, the DuerOS voice intelligence interactive system may send the voice data cached after the DuerOS voice intelligence interactive system is woken up to the cloud server for the voice recognition.

In an example, after the DuerOS voice intelligence interactive system of the smart TV is woken up, it is defaulted that no third-party application is launched. It is determined whether the interactive system is bound with a third-party application. When it is determined that no third-party application is bound, the voice data cached after the DuerOS voice intelligence interactive system is woken up may be sent to the cloud end for the voice recognition and the semantic understanding. In detail, voice activity detection may be performed on the voice data cached within 5 seconds after the interactive system is woken up. Voice segments obtained after the voice activity detection may be sent to the cloud server, as the voice data of the user.

The first voice data receiving and processing module 41 may receive the voice data from the user sent by the interactive system, and may perform the voice recognition and the sematic understanding on the voice data to obtain the instruction for launching the third-party application.

The first voice receiving and processing module 41 may apply acoustic echo cancellation (AEC) algorithm to the voice data from the user for cancelling acoustic echoes, and may apply noise suppression (NS) algorithm to the voice data from the user for cancelling environmental voice. Audio features may be extracted from the voice data processed. The audio features obtained may be decoded to obtain a result of voice recognition and text of voice recognition. Natural language processing (i.e., semantic analysis) may be performed on the text of voice recognition. The analyzed content may be categorized and may be performed with intention matching, to obtain corresponding machine instruction information. The machine instruction information may be returned back to smart television as structured data.

In an example, since the voice data may be not bound with an identifier of the third-party application, the first voice data receiving and processing module 41 may search for an instruction corresponding to the voice data from a library of instructions corresponding to the DuerOS voice intelligence interactive system. The library of instructions corresponding to the DuerOS voice intelligence interactive system may be configured to store control and command statements that are possibly performed on the DuerOS voice intelligence interactive system by the user.

For example, the voice instruction inputted by the user may be "Xiaodu, Xiaodu, please launch the NetEase Cloud Music". The cloud server may recognize the voice data to obtain the instruction of "launch the NetEase Cloud Music".

In an implementation of the first instruction sending module 42, following may be included.

The first instruction sending module 42 may send the instruction for launching the third-party application to the interactive system, such that the interactive system may execute the instruction to launch the third-party application.

The DuerOS voice intelligence interactive system may launch the third-party application according to the received instruction.

In an example, the DuerOS voice intelligence interactive system may accept to bind with the third-party application, to authenticate the third-party application and to register namespace by the third-party application, after the third-party application is launched according to the received instruction.

After the third-party application is bound to the DuerOS voice intelligence interactive system, the third-party application may run in foreground. When the third-party application is closed, it may be required to de-bind the third-party application from the DuerOS voice intelligence interactive system.

The third-party application may register the namespace, as the identifier of the third-party application.

In an example, after the DuerOS voice intelligence interactive system is woken up successfully, the voice data may be sent to the cloud server, such that the cloud server may perform the voice recognition and semantic understanding on the voice data to obtain the instruction, where the voice data received may be the voice data from the user for operating the DuerOS voice intelligence interactive system. The instruction may be executed by the DuerOS voice intelligence interactive system.

In an implementation of the second voice data receiving and processing module 43, following may be included.

After the second voice data receiving and processing module 43 receives the instruction for launching the third-party application sent by the interactive system, the second voice data receiving and processing module 43 may receive voice data for operating the third-party application from the user, and may perform the voice recognition and the semantic understanding on the voice data to obtain the instruction for operating the third-party application.

After the DuerOS voice intelligence interactive system launches the third-party application, the voice data from the user for operating the third-party application may be received. The voice data may be sent to the cloud server, such that the cloud server may perform the voice recognition and the semantic understanding on the voice data to obtain the instruction for operating the third-party application.

In an example, the voice collection unit of the smart television, such as the microphone, may collect and cache the audio data in the ambient environment where the smart television is located. Therefore, after the DuerOS voice intelligence interactive system is woken up successfully, the DuerOS voice intelligence interactive system may send the audio data cached after the DuerOS voice intelligence interactive system is woken up to the cloud server, for the voice recognition.

In an example, it is determined by the DuerOS voice intelligence interactive system whether a third-party application is bound thereto. When there is the third-party application bound to the DuerOS voice intelligence interactive system, the DuerOS voice intelligence interactive system may bind the audio data cached after the DuerOS voice intelligence interactive system is woken up with the identifier of the third-party application, and send the audio data bound with the identifier of the third-party application to the cloud end for the voice recognition and the semantic understanding. In detail, the voice activity detection may be performed on the audio data cached within 5 seconds after the DuerOS voice intelligence interactive system is woken up. Voice segments obtained after the voice activity detection may be sent to the cloud server as the voice data of the user.

In an example, the identifier of the third-party application may be the namespace registered on the DuerOS voice intelligence interactive system by the third-party application. The second voice data receiving and processing module 43 may perform the acoustic echo cancellation (AEC) algorithm on the voice data of the user for cancelling echoes, and may perform the noise suppression (NS) algorithm on the voice data of the user for cancelling environmental noise. Audio features may be extracted from the voice data of the user processed. The audio features extracted may be decoded to obtain a result of voice recognition and text of voice recognition. Natural language processing (i.e., the semantic analysis) may be performed on the text of voice recognition. The analyzed content may be categorized and may be performed with intention matching, to obtain corresponding machine instruction information. The machine instruction information may be returned back to the smart television as structural data.

In an example, since the voice data may be bound with the identifier of the third-party application, the second voice data receiving and processing module 43 may search for the instruction corresponding to the voice data from a library of instructions corresponding to the third-party application according to the identifier of the third-party application. The library of instructions corresponding to the third-party application may be uploaded by the developer of the third-party application to the cloud server and may be configured to store control and command statements that may be possibly performed on the third-party application by the user.

For example, the voice data inputted by the user may be "Xiaodu, Xiaodu, next one". The second voice data receiving and processing module 43 may recognize the instruction information of "Next One" and may return the instruction information back to the DuerOS voice intelligence interactive system.

Since the voice data may be bound with the identifier of the third-party application, the second voice data receiving and processing module 43 may bind the instruction with the identifier of the third-party application and return the instruction bound with the identifier of the third-party application back to the DuerOs voice intelligence interactive system. Therefore, the DuerOs voice intelligence interactive system may forward the instruction to the third-party application according to the identifier of the third-party application.

In an example, it may be required to wake the DuerOS voice intelligence interactive system up by the user, such that the DuerOS voice intelligence interactive system may be operated, or may invoke a self-defined skill of the third-party application.

In an implementation of the second instruction sending module 43, following may be included.

The second instruction sending module 43 may send the instruction for operating the third-party application to the interactive system, such that the interactive system may forward the instruction to the third-party application, and the instruction may be executed by the third-party application.

The DuerOS voice intelligence interactive system may receive the instruction for operating the third-party application from the cloud sever, and forward the instruction to the third-party application, such that the third-party application may execute the instruction.

In an example, the DuerOS voice intelligence interactive system may forward the instruction to the third-party application based on the identifier of the third-party application bounded with the instruction, such that the third-party application may execute the instruction.

In an example, before the DuerOS voice intelligence interactive system forwards the instruction to the third-party application, it may be determined whether the third-party application is still bound to the DuerOS voice intelligence interactive system. For example, it may be determined whether the NetEase Cloud Music is already closed. When the third-party application is still bound with the DuerOS voice intelligence interactive system, the instruction may be directly forwarded to the third-party application, such that the instruction may be executed by the third-party application. A result of executing the instruction by the third-party application may be received. When the third-party application is not bound with the DuerOS voice intelligence interactive system, the user may be informed that the third-party application is already closed, please re-launch the third-party application.

From the above description, with embodiments of the present disclosure, the cloud server may determine whether the instruction obtained by performing the voice recognition and the semantic understanding corresponds to the interactive system or to the third-party application, based on a fact whether the voice date is bound with the identifier of the third-party application. Interaction with the third-party application is done without a remote controller, thereby realizing hands free. The entire interaction may be done intelligently in voice, thereby improving the user's operation convenience and improving user experience.

Those skilled in the art may clearly understand that, for the convenience and brevity of the description, specific working processes of the described terminal and the server may be referred to corresponding processes in foregoing method embodiments, and details are not described herein.

In embodiments of the present application, it should be understood that the method and the apparatus as disclosed herein may be implemented in other manners. For example, device embodiments described above are merely illustrative. For example, the division of units is only a logical function division. In actual implementations, there may be another division manner, for example, multiple units or components may be combined or integrated into another system, or some features may be ignored or not executed. In addition, mutual coupling or direct coupling or communication connection shown or discussed may be an indirect coupling or communication connection through some interface, device or unit, and may be electrical, mechanical or the like.

Units described as separate components may be or may not be physically separated. Components illustrated as units may be or may not be physical units, which may be located in one place, or may be distributed to multiple network units. Some or all of units may be selected according to actual needs to achieve the purpose of the solution of the present disclosure.

In addition, each functional unit in embodiments of the present application may be integrated into one processing unit, or may be physically separated, or two or more units may be integrated into one unit. The integrated unit can be implemented in a form of hardware or in a form of hardware plus software functional unit.

Figure 5:
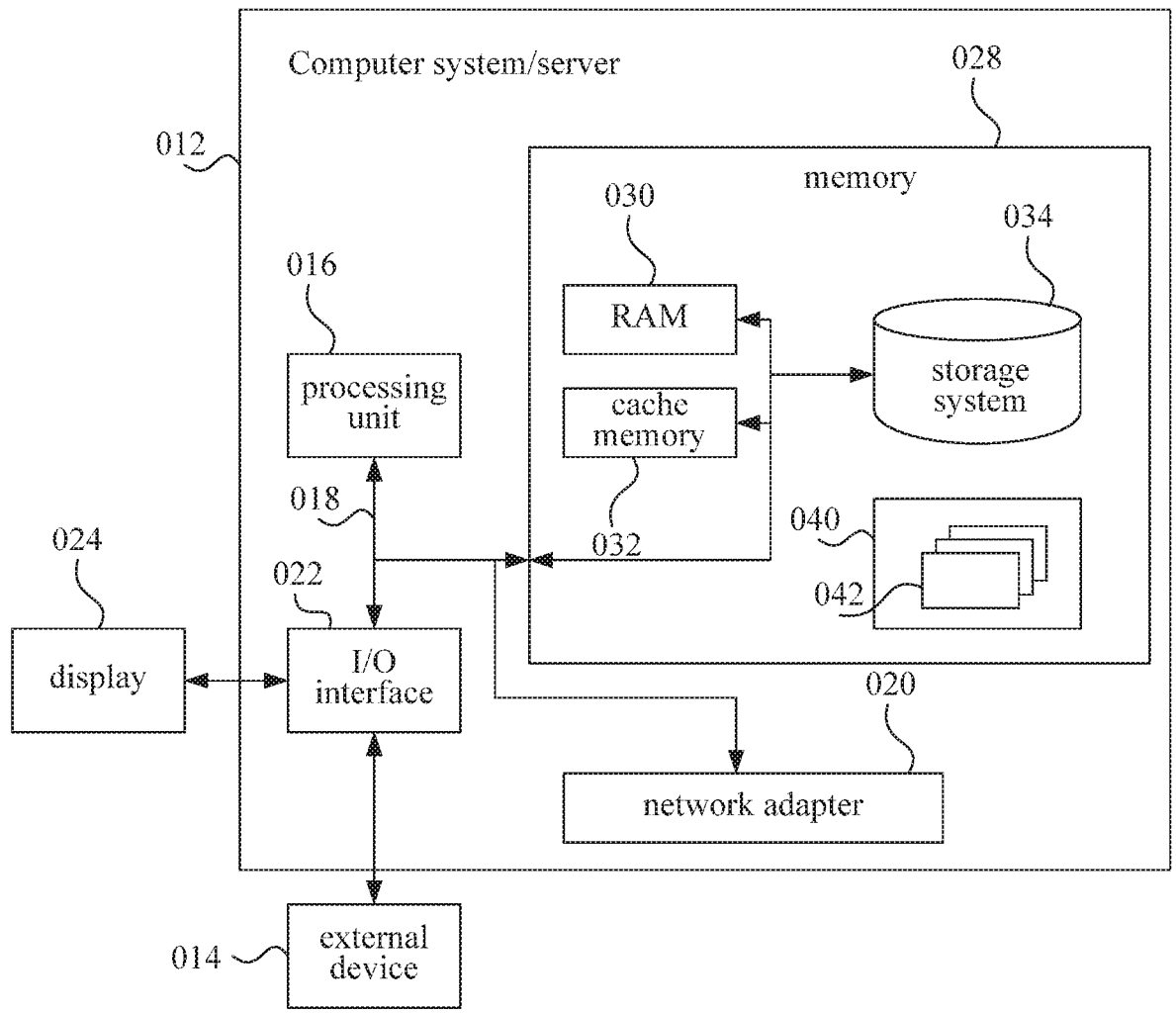
FIG. 5 is block diagram illustrating an exemplary computer system/server 012 suitable for implementing embodiments of the present disclosure.

FIG. 5 is a block diagram illustrating an exemplary computer device/server 012 suitable for realizing implementations of the present disclosure. The computer device/server 012 illustrated in FIG. 5 is merely an example, which does not limit the functions and usage scopes of the embodiments of the present disclosure.

As illustrated in FIG. 5, the computer device/server 012 is embodied in a form of a general purpose computing device. Components of the computer device/server 012 may include, but are not limited to, one or more a processor or a processing unit 016, a system memory 028, and a bus 018 connecting various system components (including the system memory 028 and the processing unit 016).

The bus 018 is one or more of several types of bus structures, including a memory bus or memory controller, a peripheral bus, a graphics acceleration port, a processor, or a local bus using any of a variety of bus structures. For example, these architectures include, but are not limited to, an industry standard architecture (hereinafter referred to as ISA) bus, a micro channel architecture (hereinafter referred to as MAC) bus, an enhanced ISA bus, a video electronics standards association (hereinafter referred to as: VESA) local bus and a peripheral component interconnection (PCI) bus.

The computer device/server 012 typically includes a variety of computer system readable media. These media may be any available media that can be accessed by the computer device/server 012, including both volatile and nonvolatile media, removable and non-removable media.

The system memory 028 may include a computer system readable medium in the form of volatile memory, such as a random access memory (hereinafter referred to as RAM) 030 and/or a cache memory 032. The computer device/server 012 may further include other removable/non-removable, volatile/non-volatile computer system storage media. By way of example only, the storage system 034 may be used to read and write non-removable and non-volatile magnetic media (not illustrated in FIG. 5, commonly referred to as "hard disk drives"). Although not illustrated in FIG. 5, a magnetic disk driver for reading from and writing to a removable and non-volatile disk (for example, a "floppy disk"), and a compact disk driver for reading from and writing to a removable and non-volatile disk (for example, a compact disc read only memory (hereinafter referred to as CD-ROM), a digital video disc read only memory (hereinafter referred to as DVD-ROM) or other optical media) may be provided. In these cases, each driver may be connected to the bus 018 via one or more data medium interfaces. The memory 028 may include at least one program product having a set (e.g., at least one) of program modules which are configured to perform the functions of the embodiments of the present disclosure.

A program/practical means 040 having a set (at least one) of program modules 042 may be stored, for example, in the memory 028. Such program module 042 includes, but is not limited to, an operating system, one or more applications, other program modules, and program data. An implementation of the network environment may be included in each or a combination of these examples. The program module 042 typically performs the functions and/or methods of the embodiments described herein.

The computer device/server 012 may also communicate with one or more external devices 014 (e.g., a keyboard, a pointing device, a display 024, etc.), and may also communicate with one or more devices enabling a user to interact with the computer device/server 012, and/or communicate with any device (e.g., a network card, modem, etc.) enabling the computer device/server 012 to communicate with one or more other computing devices. This communication can take place via an input/output (I/O) interface 022. Moreover, the computer device/server 012 may also communicate with one or more network (for example, a local area network (hereinafter referred to as LAN), a wide area network (hereinafter referred to as WAN), and/or a public network, such as the Internet) via a network adapter 020. As illustrated in FIG. 5, the network adapter 020 communicates with other modules of the computer device/server 012 via the bus 018. It should be understood that, although not illustrated in FIG. 5, other hardware and/or software modules may be utilized in conjunction with the computer device/server 012, including but not limited to: a microcode, a device driver, a redundant processing unit, an external disk drive array, a RAID system, a tape drive, a data backup storage systems, etc.

The processing unit 016 executes various functional applications and data processing by running programs stored in the system memory 028, for example, implementing the methods mentioned in the foregoing embodiments.

The computer program described above may be arranged in a computer storage medium. That is, the computer storage medium is encoded with the computer program. When the computer program is executed by one or more computers, the one or more computers are configured to perform method flowcharts and/or device operations according to embodiments of the present disclosure.

With the development of times and technology, the meaning of media is more and more extensive. The transmission route of computer programs is no longer limited by tangible media, and may also be downloaded directly from the network. Any combination of one or more computer readable media can be utilized. The computer readable medium may be a computer readable signal medium or a computer readable storage medium. The computer readable storage medium may be, for example, but not limited to, an electronic, magnetic, optical, electromagnetic, infrared, or semiconductor system, apparatus, or device, or any combination of the above. More specific examples (a non-exhaustive list) of computer readable storage medium may include: an electrical connection having one or more wires, a portable computer disk, a hard disk, a random access memory (RAM), a read only memory (ROM), erasable programmable read only memory (EPROM or flash memory), optical fiber, portable compact disk read only memory (CD-ROM), optical storage device, magnetic storage device, or any suitable combination of the foregoing. In the specification, the computer readable storage medium may be any tangible medium containing or storing a program. The program may be used by or in connection with an instruction execution system, apparatus or device.

The computer readable signal medium may include a data signal that is propagated in the baseband or as part of a carrier, carrying computer readable program codes. Such propagated data signals may be in a variety of forms including, but not limited to, electromagnetic signals, optical signals, or any suitable combination of the foregoing. The computer readable signal medium can also be any computer readable medium other than the computer readable storage medium. The computer readable medium may transmit, propagate, or transport a program for use by or in connection with the instruction execution system, apparatus, or device.

Program codes contained on the computer readable medium may be transmitted by any suitable medium, including, but not limited to, wireless, wired, fiber optic cable, RF, or any suitable combination of the foregoing.

The computer program codes for performing the operations of the present disclosure may be written in one or more programming languages or a combination thereof, including an object oriented programming language such as Java, Smalltalk, C++, and conventional Procedural programming language such as the "C" language or a similar programming language. The program codes may execute entirely on a user's computer, partly on the user's computer, as a stand-alone software package, partly on the user's computer, partly on the remote computer, or entirely on the remote computer or server. In the case of a remote computer, the remote computer may be connected to the user's computer through any kind of network, including a local area network (LAN) or a wide area network (WAN), or may be connected to an external computer (e.g., using an Internet service provider to access the Internet).

Those skilled in the art may clearly understand that, for the convenience and brevity of the description, specific working processes of the described terminal and the server may be referred to corresponding processes in foregoing method embodiments, and details are not described herein.

In embodiments of the present application, it should be understood that the method and the apparatus as disclosed herein may be implemented in other manners. For example, device embodiments described above are merely illustrative. For example, the division of units is only a logical function division. In actual implementations, there may be another division manner, for example, multiple units or components may be combined or integrated into another system, or some features may be ignored or not executed. In addition, mutual coupling or direct coupling or communication connection shown or discussed may be an indirect coupling or communication connection through some interface, device or unit, and may be electrical, mechanical or the like.

Units described as separate components may be or may not be physically separated. Components illustrated as units may be or may not be physical units, which may be located in one place, or may be distributed to multiple network units. Some or all of units may be selected according to actual needs to achieve the purpose of the solution of the present disclosure.

In addition, each functional unit in embodiments of the present application may be integrated into one processing unit, or may be physically separated, or two or more units may be integrated into one unit. The integrated unit can be implemented in a form of hardware or in a form of hardware plus software functional unit.

It should be noted that, the above embodiments are only used to explain the technical solutions of the present disclosure, and are not intended to limit the present disclosure. Although the present disclosure is already described in detail with reference to the foregoing embodiments, those skilled in the art should understand that technical solutions described in the foregoing embodiments may be modified, and some of them may be equivalently replaced. The modifications and replacements do not depart from the spirit and scope of the technical solutions of the embodiments of the present disclosure.

What is claimed is:

1. A method for interacting with a third-party application, comprising:
   receiving, by a DuerOS voice intelligent interactive system, voice data from a user, wherein two or more third-party applications are installed on the DuerOS voice intelligent interactive system, the voice data is related to one of the third-party applications and comprises a common wake-up word for the third-party applications;
   sending, by the DuerOS voice intelligent interactive system, the voice data to a cloud server, such that the cloud server obtains a first instruction for operating the third-party application from a pre-established instruction library, and the pre-established instruction library is generated by a developer of the third-party application on the DuerOS voice intelligent interactive system and uploaded to the cloud server;
   receiving the first instruction by the DuerOS voice intelligent interactive system; launching the third-party application on the DuerOS voice intelligent interactive system and forwarding the first instruction to the third-party application.

2. The method of claim 1, further comprises:
   when the DuerOS voice intelligent interactive system is bound with the third-party application, binding, by the DuerOS voice intelligent interactive system, the voice data with an identifier of the third-party application and sending, by the DuerOS voice intelligent interactive system, the voice data bound with the identifier of the third-party application to the cloud server; and
   when the interactive system is not bound with the third-party application, sending, by the DuerOS voice intelligent interactive system, the voice data to the cloud server.

3. The method of claim 2, wherein the identifier of the third-party application is registered on the DuerOS voice intelligent interactive system, after the third-party application of the DuerOS voice intelligent interactive system is launched.

4. A method for interacting with a third-party application, comprising:
   receiving, by a cloud server, voice data from a user, the voice data being sent by a DuerOS voice intelligent interactive system, wherein two or more third-party applications are installed on the DuerOS voice intelligent interactive system, the voice data is related to one of the third-party applications and comprises a common wake-up word for the third-party applications;
   obtaining, by the cloud server, a first instruction for operating the third-party application from a pre-established instruction library, and the pre-established instruction library is generated by a developer of the third-party application on the DuerOS voice intelligent interactive system and uploaded to the cloud server or; and
   sending, by the cloud server, the first instruction to the DuerOS voice intelligent interactive system, such that the third-party application is launched on the DuerOS voice intelligent interactive system and the first instruction is forwarded to the third-party application.

5. The method of claim 4, wherein,
   when the DuerOS voice intelligent interactive system is bound with the third-party application, it is determined that the voice data is bound with the identifier of the third-party application; and
   when the DuerOS voice intelligent interactive system is not bound with the third-party application, it is determined that the voice data is not bound with the identifier of the third-party application.

6. A system for interacting with a third-party application, comprising a DuerOS voice intelligent interactive system, wherein the DuerOS voice intelligent interactive system is configured to:
   receive voice data from a user, wherein two or more third-party applications are installed on the DuerOS voice intelligent interactive system, the voice data is related to one of the third-party applications and comprises a common wake-up word for the third-party applications;
   send the voice data to a cloud server, such that the cloud obtains a first instruction for operating the third-party application from a pre-established instruction library, and the pre-established instruction library is generated by a developer of the third-party application on the DuerOS voice intelligent interactive system and uploaded to the cloud server;

receive the first instruction by the DuerOS voice intelligent interactive system; launch the third-party application on the DuerOS voice intelligent interactive system and forward the first instruction to the third-party application.

7. The system of claim 6, wherein the interactive system is further configured to:

when the DuerOS voice intelligent interactive system is bound with the third-party application, bind the voice data with an identifier of the third-party application and send the voice data bound with the identifier of the third-party application to the cloud server; and when the DuerOS voice intelligent interactive system is not bound with the third-party application, send the voice data to the cloud server.

8. The system of claim 7, wherein the identifier of the third-party application is registered on the DuerOS voice intelligent interactive system, after the third-party application of the DuerOS voice intelligent interactive system is launched.

9. A system for interacting with a third-party application, comprising a cloud server, wherein the cloud server is configured to:

receive voice data from a user, the voice data being sent by a DuerOS voice intelligent interactive system, wherein two or more third-party applications are installed on the DuerOS voice intelligent interactive system, the voice data is related to one of the third-party applications and comprises a common wake-up word for the third-party applications;

obtain a first instruction for operating the third-party application from a pre-established instruction library, and the pre-established instruction library is generated by a developer of the third-party application on the DuerOS voice intelligent interactive system and uploaded to the cloud server; and send the first instruction to the DuerOS voice intelligent interactive system, such that the third-party application is launched on the DuerOS voice intelligent interactive system and the first instruction is forwarded to the third-party application.

10. The system of claim 9, wherein, when the DuerOS voice intelligent interactive system is bound with the third-party application, it is determined that the voice data is bound with the identifier of the third-party application; and when the DuerOS voice intelligent interactive system is not bound with the third-party application, it is determined that the voice data is not bound with the identifier of the third-party application.

* * * * *